Dec. 30, 1969     C. E. SCHEFFLER     3,486,591
DUAL AUTOMOTIVE BRAKE SYSTEM
Filed June 19, 1968
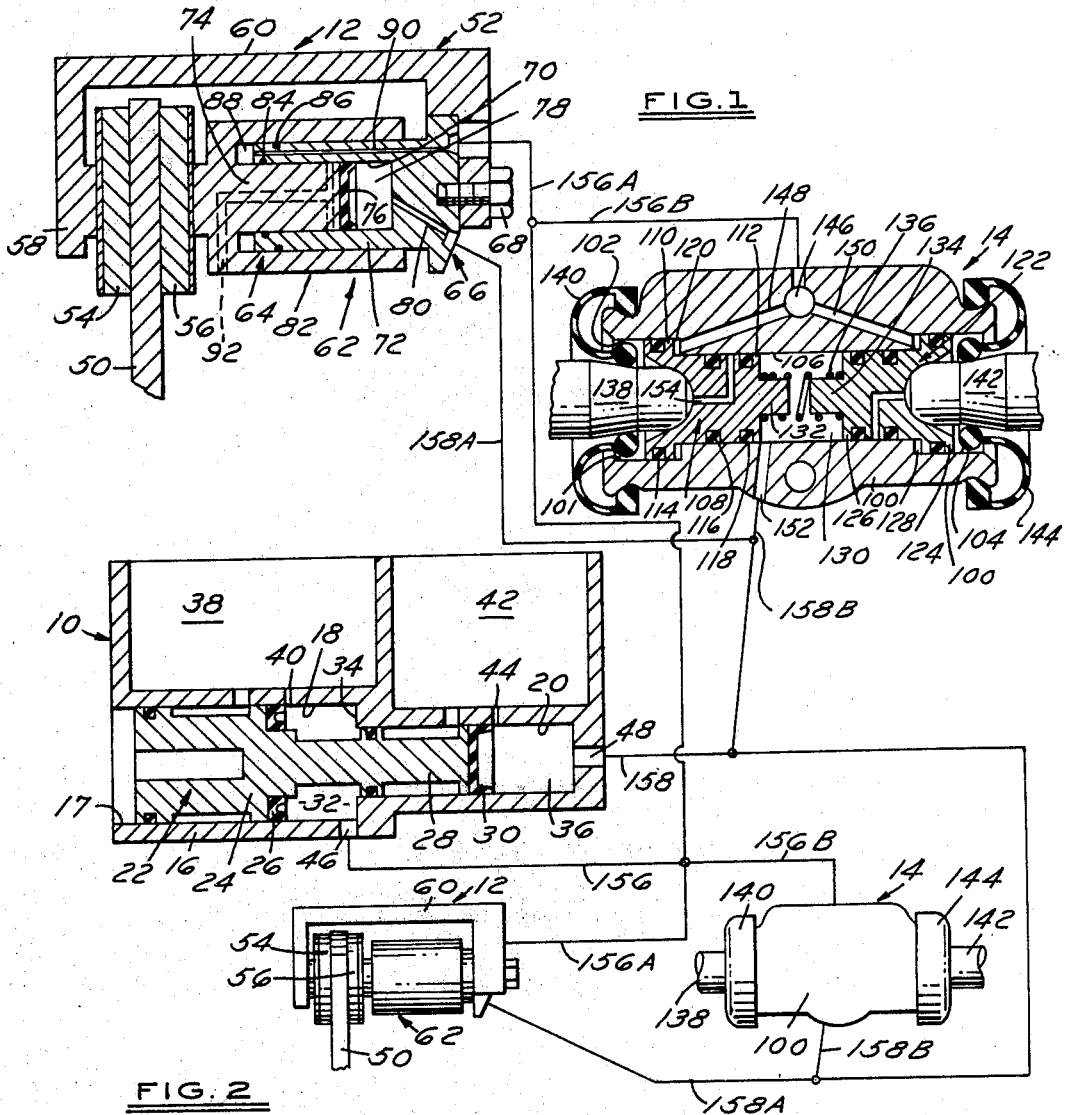
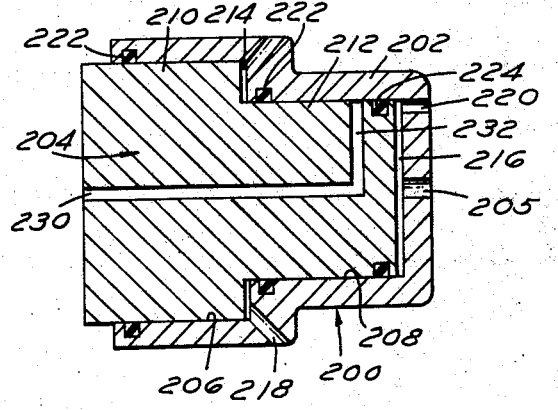
INVENTOR
CLARENCE E. SCHEFFLER
BY John R. Faulkner
Clifford L. Sadler
ATTORNEYS

United States Patent Office 3,486,591
Patented Dec. 30, 1969

3,486,591
DUAL AUTOMOTIVE BRAKE SYSTEM
Clarence E. Scheffler, 12916 Lenore,
Detroit, Mich. 48239
Filed June 19, 1968, Ser. No. 738,317
Int. Cl. F16d 65/32; B60t 11/20
U.S. Cl. 188—106                                2 Claims

ABSTRACT OF THE DISCLOSURE

A dual automotive brake system having a plurality of wheel brakes each with dual pressure chambers. A dual master cylinder has one of its pressure chambers connected to one of the pressure chambers of each of the brakes. The other chamber of the master cylinder is connected to the other chamber of each of the brakes. With this construction, four-wheel braking is provided when either or both of the pressure chambers of the master cylinder are pressurized.

BACKGROUND OF THE INVENTION

It has been recognized that a dual braking system for an automotive vehicle has certain advantages. In the currently conventional system, the brake master cylinder has first and second pressure chambers that are connected to front and rear brakes, respectively. The front and rear portions of the system are mutually exclusive so that a hydraulic failure in one half will not affect the other half and it may be utilized to stop the vehicle. In the event of such a failure, however, only two of the four vehicle brakes are operable.

In view of the state of the art, it is the principal object of the present invention to provide a braking system of the redundant type in which four-wheel braking is possible even though there is a failure in a portion of the hydraulic system.

BRIEF SUMMARY OF THE DISCLOSURE

In the presently preferred embodiment of this invention, a dual brake system for a vehicle has a pair of front brakes, a pair of rear brakes, a dual master cylinder and communication means connecting the dual master cylinder with the brakes. Each of the brakes has a housing with a piston slidable within the housing. The piston and housing combined to form a pair of coaxial pressure chambers either of which may be pressurized to force the piston against the brake lining which, in turn, is pressed against a brake drum or brake disc.

The dual master cylinder has mutually exclusive pressure chambers and the communication means connects one of the pressure chambers of the master cylinder with one of the pressure chambers of each of the brakes. The communication means also connects the other pressure chamber of the master cylinder with the other pressure chamber of each of the brakes whereby the creation of hydraulic pressure in either or both of the chambers of the master cylinder will affect the actuation of all four brakes.

BRIEF DESCRIPTION OF THE DRAWING

The many objects and advantages of the present invention will become amply apparent upon consideration of the following discussion and the accompanying drawings, in which:

FIGURE 1 discloses a schematic representation of a brake system having a front disc brake, a rear wheel cylinder assembly and a dual master cylinder shown in sectional view; and FIGURE 2 is an alternate embodiment of the invention showing a portion of a disc brake caliper in section.

DETAILED DESCRIPTION OF THE INVENTION

Referring now to the drawings for a detailed description of the invention, FIGURE 1 discloses a hydraulic brake system for a motor vehicle. FIGURE 1 discloses a dual master cylinder 10, a pair of front brakes 12 and a pair of rear brakes 14. A plurality of brake lines are provided to connect the dual master cylinder 10 with the brakes 12 and 14.

The master cylinder 10 includes a housing 16 with an internal bore 17 having a large diameter portion 18 and a small diameter portion 20. A piston 22 fits within the bore 17 and has a large diameter poriton 24 that carries a seal 26 which, in turn, slidably engages the wall of bore portion 18. A reduced diameter portion 28 of the piston 22 extends forwardly from the portion 24 and has a seal 30 situated at its forward end.

Within the housing 16 of the master cylinder 10, a first pressure chamber 32 is defined in part by the bore portion 18, the seal 26 and a shoulder 34 situated between bore portions 18 and 20. The pressure chamber 32 is of annular configuration due to the presence of the portion 28 of the piston 22. A second pressure chamber 36 is situated forwardly in the housing 16 and is defined in part by the bore portion 20 and the seal 30. A fluid reservoir 38 communicates with the annular first pressure chamber 32 by means of a port 40. A second fluid reservoir 42 communicates with the chamber 36 by means of a replenishing port 44.

The annular pressure chamber 32 has an outlet port 46 for connecting the chamber to the brakes 12 and 14. Similarly, the pressure chamber 36 has an outlet port 48 for connecting it to the brakes 12 and 14.

The front brakes 12 are of the disc type and each includes a brake rotor 50, a brake caliper assembly 52 and a pair of brake linings 54 and 56. The linings 54, 56 are disposed on opposite sides of the rotor 50. Brake lining 54 is supported by a limb 58 that extends radially inwardly from the housing 60 of the caliper assembly 52. A hydraulic motor 62 having a piston part 64 and a cylinder part 66 also forms a part of the caliper assembly 52. The cylinder part 66 is secured to the housing 60 by means of a bolt 68. The piston part 64 is constructed to engage the brake lining 56.

The cylinder part 66 has a central bore 70 that forms an annular wall 72. The piston 64 has a central piston part 74 that is slidably disposed within the bore 70. A seal 76 is provided at the end of the piston portion 74 so as to form a hydraulic fluid chamber 78 at the depth of the bore 70. An inlet port 80 in the cylinder part 66 permits the chamber 78 to be connected to a fluid pressure source.

The piston 64 also includes an annular wall 82 situated radially outwardly from the central piston part 74 and spaced apart therefrom. The annular wall 72 of the cylinder part 66 fits into the annular space between the central piston portion 74 and the annular piston portion 82. O-ring seals 84 and 86 are provided to seal the surface-to-surface engagement between the exterior surface of the piston part 74 and the internal surface of the bore 70 as well as the surface-to-surface engagement between the exterior surface of the cylindrical portion 72 and the annular piston part 82. This construction provides an annular pressure chamber 88. An axially extending passageway 90 in cylinder part 66 communicates with the annular pressure chamber 88 and provides a means for connecting that pressure chamber to a fluid pressure source.

The piston 64 engages the brake lining 56 and is constructed to force that lining into engagement with the rotor 50 when hydraulic pressure is applied to either chamber 78 or 88 or both of said chambers.

The annular pressure chamber 88 and the pressure chamber 78 are mutually exclusive. Their exclusivity is assured by the seals 76 and 84. A passageway 92 is provided within the piston portion 74 that communicates with the surface of the piston portion between the seals 76 and 84. If either seal 76 or 84 should fail, then fluid leaking past the faulty seal would seep out of the passage 92 and would indicate to a mechanic that one of the internal seals was defective.

The rear brakes 14 are of the drum and shoe variety and each includes a wheel cylinder as seen in FIGURE 1. The wheel cylinder comprises a housing 100 having an internal bore 101 with large diameter bore portions 102 and 104 situated at the outer ends and a central bore portion 106 of lesser diameter. A left piston 108 is situated within the bore 101 of the housing 100 and includes a large diameter portion 110 in sliding engagement with the large diameter bore portion 102. The piston 108 also includes a small diameter portion 112 that slidably engages the central bore portion 106.

The left piston 108 has a seal 114 that engages the wall of the large bore portions 102 and a pair of seals 116 and 118 that engage the walls of the central bore portion 106. The construction of the piston 108 and the bore 102 defines an annular pressure chamber 120. The right-hand piston 22 is similarly constructed and includes a large diameter part 124 and a small diameter part 126. An annular chamber 128 is formed between the piston 122 and the bore portion 104. A pressure chamber 130 is formed between the pistons 108 and 122 in conjunction with the central bore 106.

The pistons 108 and 122 are provided with pilot portions 132 and 134, respectively, which form a retaining means for a coil spring 136. The coil spring 136 is loaded in compression and tends to force the pistons 108 and 122 outwardly.

The remainder of the construction of brake 14 is reasonably conventional. A strut 138 has an inner end engaging the piston 108 and an outer end engaging a brake shoe. A boot seal 140 is interposed between the housing 100 and the strut 138. The seal 140 prevents contaminants from entering bore 101. Similarly, a strut 142 engages the right-hand piston 122. A seal 144 is interposed between the housing 100 and strut 142 to seal the end of the bore 104.

A passageway 146 has branch portions 148 and 150 connected to the annular pressure chambers 120 and 128, respectively. This construction permits the annular chambers 120 and 128 to be connected to a fluid pressure source. An inlet port 152 communicates with the chamber 130 and permits that chamber to be connected to a fluid pressure source.

A central passage 154 in the piston 108 communicates with the surface of the piston between the seals 116 and 118. If either of these seals should fail permitting the escape of fluid from either chamber 120 or 130, such escaped fluid would seep through the passage 154 and would become visible on the exterior surface of the wheel cylinder 100. This would indicate to a mechanic that an internal seal had failed and that the unit needed servicing.

Conventionally, the brake 14 is actuated by pressurization of the annular chambers 120 and 128 and chamber 130 from a dual pressure source. The brake may also be actuated by pressurization of just chamber 130 or just chambers 120 and 128.

Hydraulic plumbing is provided to connect the dual master cylinder 10 to the brakes 12 and 14. A brake line 156 is connected to port 46 of annular chamber 32 of the master cylinder 10. Brake line 156 has branches 156A which lead to the front brakes 12 and branches 156B which lead to the rear brakes 14. Brake line 156A connects to passage 90 of each brake 12 and provides communication between master cylinder chamber 32 and annular brake chamber 88.

Brake line 156B connects to port 146 of the rear brakes 14 which, in turn, is joined through passages 148 and 150 to the annular chambers 120 and 128. Thus, brake line 156 and its branches 156B provide communication between master cylinder chamber 32 and annular chambers 120 and 128.

Brake line 158 connects to port 46 of the master cylinder 10 and its branches 158A are connected to the front brakes 12 and its branches 158B are connected to the rear brakes 14. Brake lines 158A connect to port 80 and pressure chamber 78 of each brake 12. Brake line branches 158B connect to ports 152 and chambers 130 of rear brakes 14. Thus, brake line 158 and its branches 158A and 158B provide communication between the dual master cylinder chamber 36 and chamber 58 of each brake 12 and chambers 130 of each brake 14.

OPERATION

The brake system of FIGURE 1 operates in the following fashion. When the piston 22 of master cylinder 10 is moved to the right in response to the actuation of a brake pedal and linkage system (not shown), fluid within chambers 32 and 36 is pressurized. Due to the communication provided by brake lines 156 and 158, movement of the master cylinder piston 22 will create fluid pressure in chambers 78 and 88 of brakes 12 and chambers 120, 128 and 130 of brakes 14. In brake 12, pressurization of chambers 78 and 88 will force the linings 56 and 54 into engagement with the rotor 50. In brake 14, pressurization of chambers 120, 128 and 130 will cause the pistons 108 and 122 to move outwardly forcing the links 138 and 142 and the brake linings (not shown) connected thereto into engagement with the brake drum.

If a failure should occur in brake line 156 or any of the components connected to it, then the brake system would still be functional and all four brakes would still be operable. A failure in line 156 would prevent the establishment of hydraulic pressure in chambers 88 of brakes 12 and chambers 120 and 128 of brakes 14. At the same time, however, the creation of pressure in chamber 36 of master cylinder 10 would be communicated to chambers 78 of brakes 12 and chambers 130 of brakes 14. This pressure would be sufficient to actuate both pairs of brakes 12, 14 and to provide four-wheel braking.

Chambers 32 and 36 of master cylinder 10 have the same effective cross sectional area and, therefore, the same displacement. Similarly, in disc brakes 12, the cross sectional area of the annular chamber 88 is the same as the cross sectional area of the cylindrical chamber 78. In a like manner, the displacement of the annular chambers 120 and 128 of brakes 12 is equal to the displacement of the chamber 130. With this arrangement, the hydraulic pressure in the two halves of the system are equal during a brake application. The pressures in the annular chambers 88, 120 and 128 of brakes 12 and 14 and in annular chamber 32 of master cylinder 10 is equal to the pressure in chambers 78 and 130 of brakes 12, 14 and chamber 36 of master cylinder 10. Therefore, one half of the brake torque is caused by the portion of the system having the annular chambers and the other half is caused by the system having the cylindrical chambers.

If a hydraulic failure occurs in one portion of the system, then one half of the pressure reaction area at the brakes 12 and 14 is ineffective. At the same time, one half of the pressure reaction area in the master cylinder 10 is also ineffective. The total force to clamp the brake pads 54 and 56 against the rotor 50 and to force the shoes of brake 14 against the drum is now supplied by the remaining portions of the brake system. This causes the pressure in the intact portion of the system to double. The doubled pressure acting on one half of the total reaction area in the master cylinder maintains the normal pedal effort and pedal travel. In effect, the brake system as a whole has changed from a low pressure, high volume system to a high pressure, low volume system.

It should be stated that the pressure reaction areas need not be equal, that is, the displacement of annular chamber 32 in master cylinder 10 need not equal the displacement of chamber 36 as long as the ratio of the displacements between chambers 32 and 36 is the same as the ratio of displacement between the chambers in the disc brake 12 and in the wheel cylinder of brake 14.

FIGURE 2 EMBODIMENT

FIGURE 2 discloses a hydraulic motor 200 that may be substituted for the hydraulic motor 62 of brake 12. The hydraulic motor 200 includes a cylinder part 202 and a piston part 204. A threaded hole 205 in cylinder part 204 permits the hydraulic motor 200 to be connected to a caliper housing by means such as the bolt 68.

The cylinder part 202 is centrally bored and has a large diameter bore portion 206 and a smaller diameter bore portion 208. The piston 204 has a large diameter portion 210 that slidably engages the wall of the larger bore portion 206. The piston also has a small diameter portion 212 that slidably engages the wall of the small bore portion 208.

An annular chamber 214 is disposed between the step joining the piston portions 210 and 212 and the shoulder joining the bore portions 206 and 208. A second hydraulic chamber 216 is situated at the inner end of the small piston portion 212 and the end of the small bore portion 208. A port 218 in the wall of the cylinder part 202 communicates with the annular chamber 214 and provides a means for connection with a hydraulic fluid pressure source such as by means of the brake line 156A of FIGURE 1. A port 220 provides communication with the chamber 216 and may be connected to a brake line, such as brake line 158A.

A seal 222 engages the large diameter piston portion 210 and prevents the escape of fluid from chamber 214. Spaced apart seals 222 and 224 prevent the leakage of fluid from the annular chamber 214 to chamber 216 and vice versa. The piston 204 has an axial passage 230 with a connecting radial portion 232. Passage 230 extends exteriorly of the motor 200 and passage 232 extends to the surface of the piston 204 situated between the seals 222 and 224. Passages 230, 232 function in a manner similar to the passage 92 of brake 12 and passage 154 of brake 14. Fluid leaking past either seal 222 or 224 would leak out of the passage 230 and would indicate to a mechanic upon inspection that an internal seal had failed.

The hydraulic motor 200 of FIGURE 2 may be substituted for hydraulic motor 62 of FIGURE 1. Their operation is substantially identical due to the presence of mutually exclusive pressure chambers 214 and 216. Either or both of these chambers may be pressurized to perform a brake application.

The foregoing description presents the presently preferred embodiment of this invention. Modifications and alterations may occur to those skilled in the art that will come within the scope and spirit of the invention.

I claim:

1. A dual brake system for a vehicle having a pair of front brakes, a pair of rear brakes, a hydraulic pressure source and communication means connecting said source to said brakes, said pair of front brakes comprising a front rotating brake member constructed to be connected to a front wheel of a vehicle, said front brakes also comprising a front nonrotating assembly including a front brake lining means constructed to engage said front rotating member, said front non-rotating assembly including a front housing a bore and a front piston means slidably engaging said front housing, said front piston means and said front housing being constructed to define a pair of mutually exclusive hydraulic pressure chambers interposed between said front piston means and said front housing, said hydraulic pressure chambers being coaxially arranged and axially spaced apart, one of said chambers being of annular shape, said front piston means having a central piston portion and a cylindrical member spaced outwardly from said central piston portion, said front housing having a cylindrical member with an inner surface defining a portion of said bore, said cylindrical member of said front housing being fitted into the space between said central piston portion and said cylindrical member of said front piston means, said one pressure chamber being defined in part by said central piston portion, said cylindrical wall of said piston means and the end of the cylindrical wall of said housing, said other pressure chamber being defined by said bore and the end of said central piston portion, said front piston means being constructed to engage said front brake lining means and to force said front brake lining means into engagement with said front rotating member in response to fluid pressure in either of said pressure chambers, said pair of rear brakes comprising a rear rotating brake member constructed to be connected to rotate with a rear wheel of the vehicle, said rear brakes also comprising a rear non-rotating assembly including a rear brake lining means constructed to engage said rear rotating brake member, said rear non-rotating assembly including a rear housing and rear piston means slidably disposed in said rear housing, said rear piston means comprising a pair of coaxially arranged pistons each constructed to define an annular chamber between said pistons and said rear housing, said rear piston means also being constructed to define a hydraulic pressure chamber between said pistons, said rear piston means being constructed to engage said rear brake lining means and to force said rear lining means against said rear rotating brake member in response to fluid pressure in either of said pressure chambers within said rear housing, said hydraulic pressure source having first and second mutually exclusive pressure chambers, said communication means connecting said first pressure chamber of said pressure source with one of the pressure chambers of said front brake and one of the pressure chambers of the rear brake, said communication means also connecting said second pressure chamber of the pressure source with the other pressure chamber of said front brake and the other pressure chamber of said rear brake whereby the creation of hydraulic pressure in either of the pressure chambers of the pressure source will affect brake actuation of both said front and rear brakes.

2. A hydraulic brake actuator including:

a housing, a bore formed within said housing, piston means slidingly received in said bore and constructed to engage a brake lining, said piston means and said housing being constructed to define first and second pressure chambers, said chambers being coaxially arranged and axially spaced apart, one of said chambers being spaced radially outwardly from the other pressure chamber, said piston means having a central piston portion and a cylindrical member spaced outwardly from said piston portion, said housing having a cylindrical member with an inner surface defining a portion of said bore, said cylindrical member of said housing being fitted into the space between said central piston portion and said cylindrical member of said piston means, said one pressure chamber being defined in part by said central piston portion, said cylindrical member of said piston means and the end of the cylindrical member of said housing, said other pressure chamber being defined by said bore and the end of said central piston portion, said chambers being mutually exclusive, said piston means being constructed to move said brake lining when either or both of said chambers are pressurized with hydraulic fluid.

References Cited

UNITED STATES PATENTS 3,403,602  10/1968  Brandon _____ 188—152

FOREIGN PATENTS 997,933  9/1951  France.
1,338,610  8/1963  France.
1,462,082  11/1966  France.

GEORGE E. A. HALVOSA, Primary Examiner

U.S. Cl. X.R.

92—75, 110, 165; 188—152